United States Patent [19]

Bayer

[11] Patent Number: 4,561,165
[45] Date of Patent: Dec. 31, 1985

[54] METHOD AND APPARATUS FOR MAKING HOOK TO RAIL CONNECTION FOR SCAFFOLDS OR THE LIKE

[75] Inventor: Thomas E. Bayer, Girard, Pa.

[73] Assignee: R. D. Werner Co., Inc., Greenville, Pa.

[21] Appl. No.: 616,860

[22] Filed: Jun. 4, 1984

[51] Int. Cl.[4] .......................... B21D 39/00; E06C 7/16; B25G 3/20
[52] U.S. Cl. .................................. 29/522 R; 182/119; 182/222; 403/374
[58] Field of Search ........................ 248/235, 247, 248; 182/119, 222; 403/373, 374; 29/522 R

[56] References Cited

U.S. PATENT DOCUMENTS

| | | | |
|---|---|---|---|
| 3,290,746 | 12/1966 | Broske | 403/374 |
| 3,374,861 | 3/1968 | Shaver | 182/222 |
| 3,926,531 | 12/1975 | Gostling | 403/374 |
| 4,027,939 | 6/1977 | White | 403/374 |

Primary Examiner—Howard N. Goldberg
Assistant Examiner—Steven Nichols
Attorney, Agent, or Firm—J. Helen Slough

[57] ABSTRACT

A method and apparatus for making hook-to-rail connections for scaffolds or the like, namely a method of securing an offset hook to a rail or beam of generally I-shape by inserting an arcuate plate of such ductility as to be deformable upon extension thereof to fill spacing between the flanged ends of the rail or beam and the hook and to secure the hook to the rail.

5 Claims, 8 Drawing Figures

METHOD AND APPARATUS FOR MAKING HOOK TO RAIL CONNECTION FOR SCAFFOLDS OR THE LIKE

The present invention relates to improvements in scaffolds and, more particularly, is concerned with apparatus and method for making connections for scaffold planks or platforms.

In the past, scaffold planks or platforms have commonly been provided with extruded aluminum or plywood decks secured to extruded aluminum channel shaped side rails or beams to which hooks are offset and extend at the ends of the rails or beams for fastening the plank or platform onto transverse end members of the scaffold for in-line installation of the same. The end hooks in certain prior art devices have been constructed of two substantially identical parts integrally secured together at their notched or hook ends which extend outwardly of the plank or platform, and each part having a substantially flat inner portion adapted to be placed in spaced relationship to each other and disposed flush on opposite sides of the web of the said channeled rails or beams and secured thereto.

An object of this invention is to provide braces for the hook members for strengthening the hook to rail connection and filling gaps between the hook and the rail connection, reinforcing the web of the rail, and tying the hook to the flange.

Another object of this invention is to reinforce the side rail web and tie the hook into the flange of the rail thereby taking advantage of the entire channel shaped beam section to absorb impacts to the hooks.

A still further object of the invention is to provide a secure hook to rail joint connection without requiring any modification of the beam cross section.

Yet another object of the invention is to provide an improved lock between the hook and the rail whereby the connection will be secure and remain secure under impacts encountered by the plank.

A further object of the invention is to provide for installation in the field of the hook to rail connection with common readily available tools not requiring the use of specific tools.

Other objects of the invention and the invention itself will become apparent from a perusal of the drawings and appended specification.

SUMMARY OF THE INVENTION

A brace preferably constructed of ductile material such as aluminum, which in its initial form is C-shaped and provided with nodes or bulbs at either end adapted to be associated with a channel shaped rail or beam secured to a deck or plank of a scaffold to secure an offset hook member to the rail or beam of the scaffold deck or plank. A bulb-shaped end of the brace is adapted to be initially seated in a gap between the hook member and the bottom flange of the side rail and is of such size and ductility that when the brace is flattened it will lengthen and completely fill gaps between not only the hook and the bottom flange of the rail but gaps between the hooks and the top flange of the said rail or beam. Variations in the sizes of the component rails and hooks can be compensated for by varying the degree of flattening of the brace.

Flattening of the brace after its initial seating in the gap between the hook and the flanges of the rail can be accomplished in a number of ways, two of which are illustrated and described herein.

In the drawings:

FIG. 5 is a view similar to that of FIG. 1 but illustrating the braces in their final deformed position;

FIG. 8 is a view similar to FIGS. 1 and 5 but showing a flat plate to which the hook and rail or beam are riveted as in the prior art.

Figure 1:
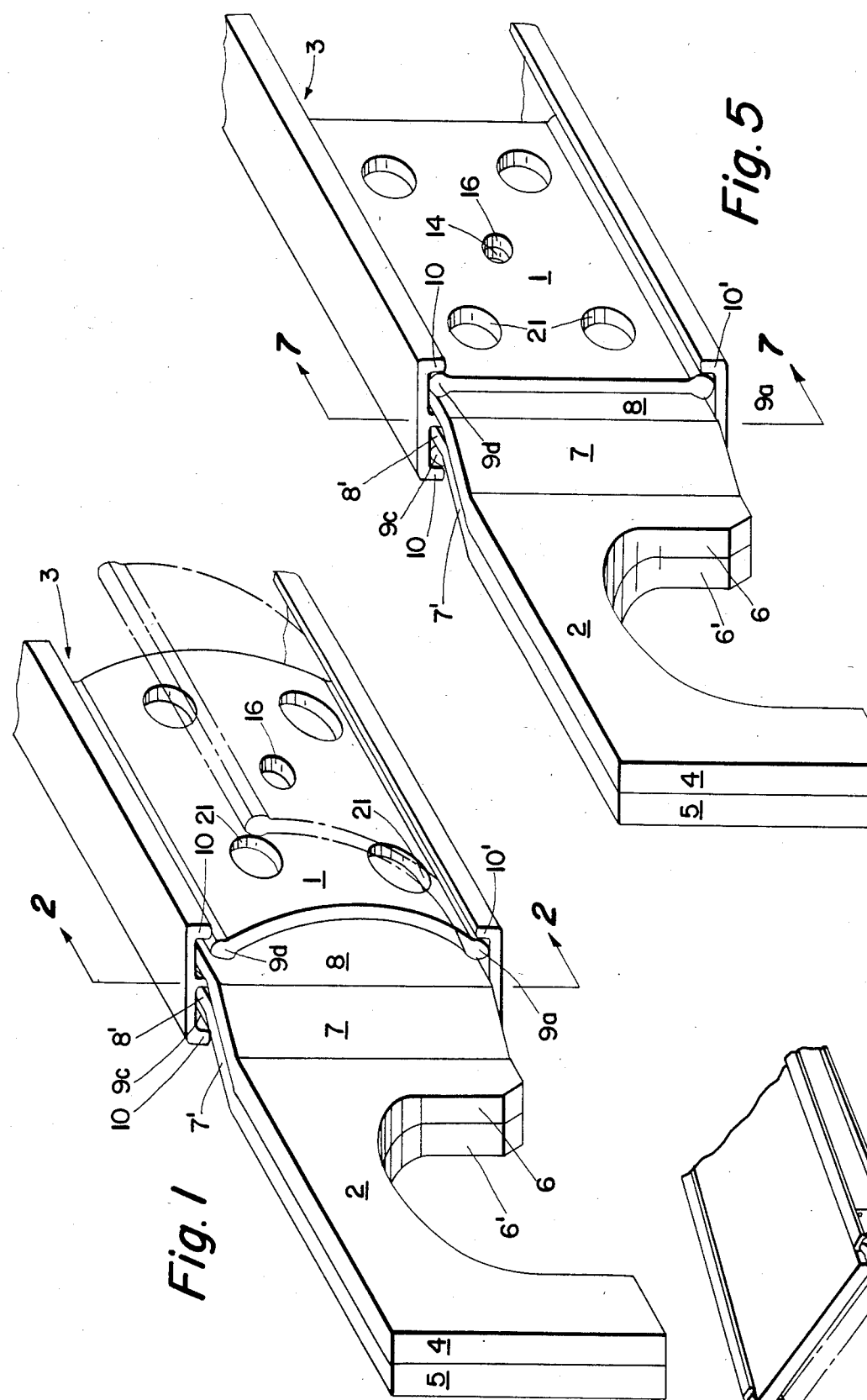
FIG. 1 is a perspective view of the hook end of the scaffold plank or platform showing a side rail or beam adapted to be secured to a plank or platform by brace means, which means are shown in an initial and adjusted position.

Referring now more particularly to the drawings, in all of which like parts are designated by like reference characters, in FIG. 1 is shown a siderail or beam 3 preferably of I-shape form having end flanges 10, 10' the rail being preferably formed of extruded aluminum, an offset hook clamp 2 of extruded aluminum preferably formed of a pair of co-acting parts, each part being a substantially flat outer end portion provided with an inverted U-shaped matching notch 6, 6' therein, the matched notches forming an offset hook adapted to be clamped over structural beams or crosspieces of work platforms, planks, or decks, for scaffolds or the like. The clamp is further provided, as shown, with oppositely angled portions 7 and 7' adapted to wrap around the ends of the rail or beam to which it is to be attached and terminating in spaced inner flat end surfaces 8, 8' adapted to abut opposite faces of the stem or web 11 of the beam, as best shown in FIGS. 2 to 7 inclusive, and being secured thereto as by rivets or the like, as shown in FIG. 8.

To secure each of the hooks in their assembled position on the rail or beam this invention provides a pair of extruded aluminum hook braces 1, of ductile material and preferably concave form, preferably provided with bulb end or toe pieces 9a, 9b and 9c, 9d respectively on the lower and upper ends of the same. The bulb or toe end 9a of each of the pair of braces is placed in a gap "X" which exists in the I-shaped siderail between end flanges 10, 10' of the beam and the end surfaces 8, 8' of the hooks seated therein.

Figure 2:
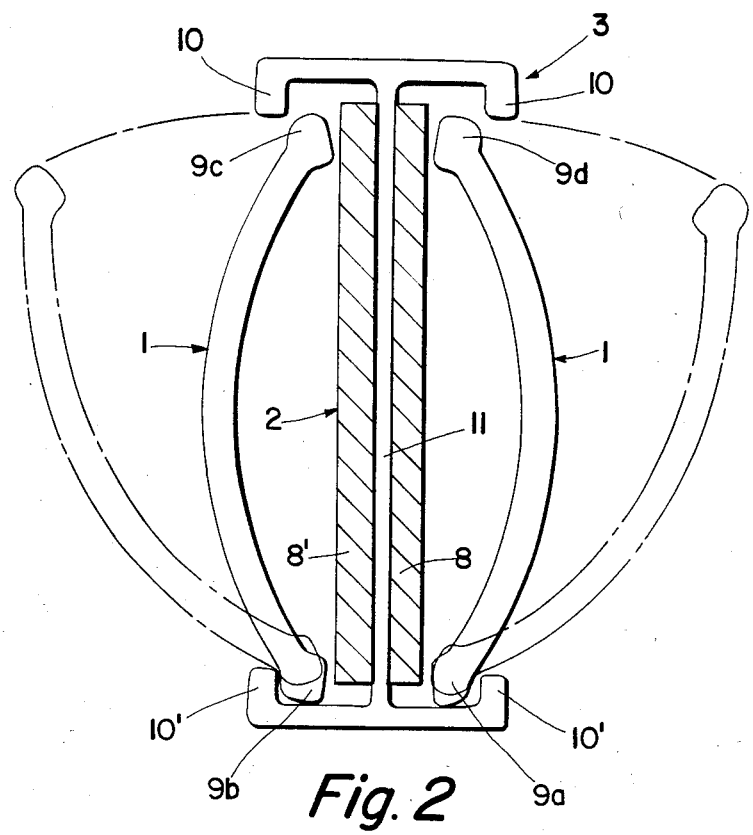
FIG. 2 is a sectional view of FIG. 1 taken substantially along the line 2—2 of FIG. 1 and showing the hook parts in section disposed on either side of the beam and the brace in an initial and an adjusted position.
Figure 6:
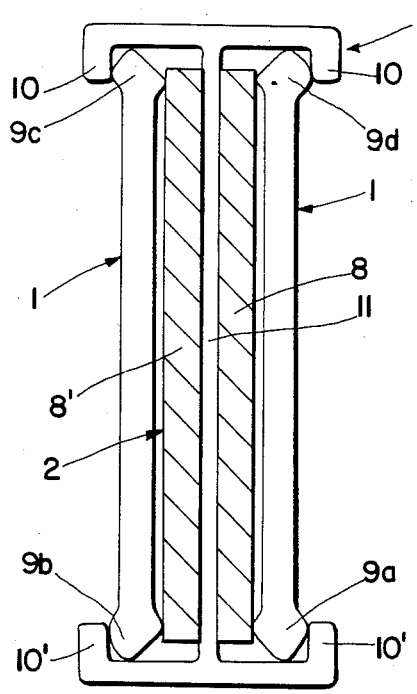
FIG. 6 is a sectional view of FIG. 5 as viewed from line 7—7 of FIG. 5.

To strengthen the hook-to-rail connection and to fill the gaps "X" between the hook and rail connection, the toe pieces or bulbs 9a and 9b of the braces are placed or heeled in the gaps "X" as shown in FIG. 2 between the end flanges of the lower edge of the beam and the hook portions 8, 8' and flattened by means, as hereinafter described to wedge the braces in place, as shown in FIG. 6. In the flattening process the braces lengthen and fill the spaces between the flanges of the I-beam and the hook as shown in FIGS. 6 and 7.

The braces preferably are provided with apertures which clear or surround, in the form of the invention shown in FIG. 1, rivets (not shown) used to connect the hook clamp to the I-beam.

Figure 3:
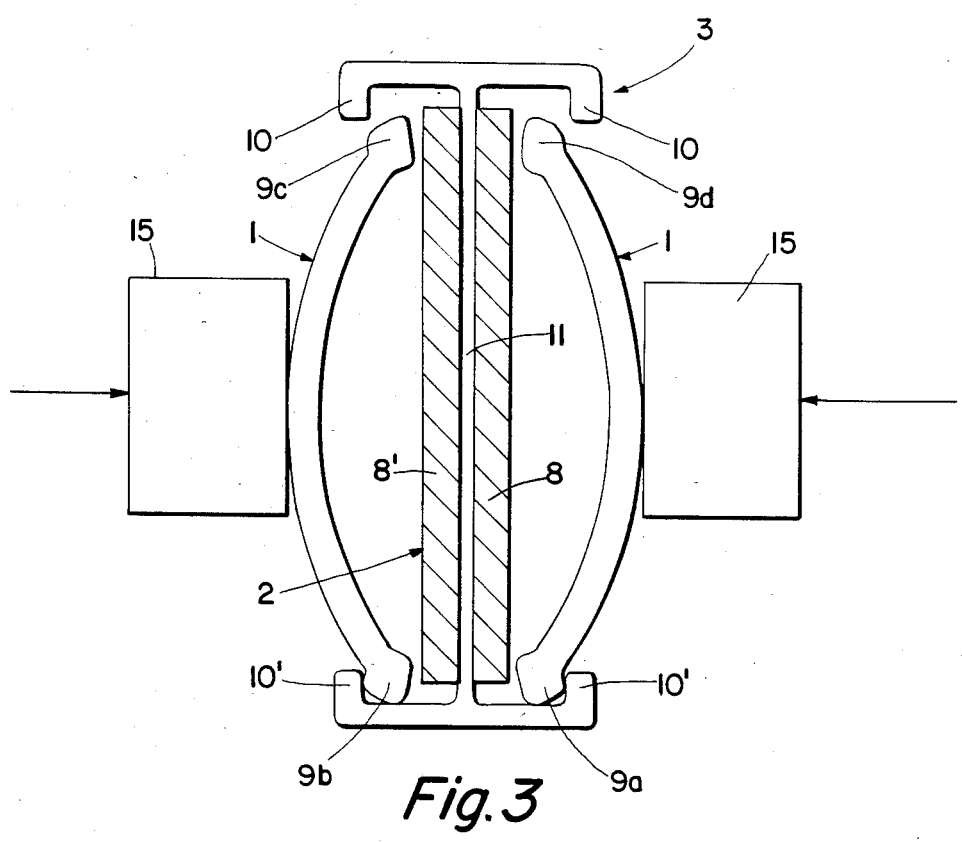
FIG. 3 is a sectional view similar to that of FIG. 2 showing the rail means for deforming the hook braces of FIG. 2.
Figure 4:
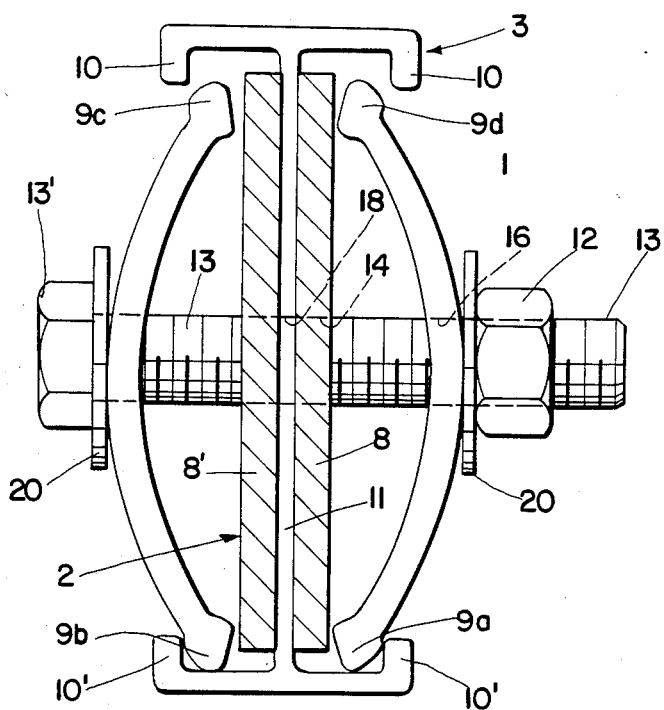
FIG. 4 is a view similar to that of FIG. 3 but showing an alternative means for deforming the hook braces from that of FIG. 3.

In the alternate form of the invention shown in FIG. 3, force is applied to the center of the arc of each brace by means of an pneumatic riveter 15. In the form of the invention shown in FIG. 4, a center opening 16 is provided or drilled in the brace which is adapted to be aligned with a center opening 14 drilled in the web abutting portions 8, 8' of the hook and an opening 18 in the web or stem of the I-beam. A bolt 13 is placed through the aligned openings 16, 14 and 18 of said elements and a nut 12 disposed on the end of the bolt is tightened to flatten the braces. Steel washers 20 are used under the bolt head 13' and the nut 12 on each side of the beam to distribute the load, and prevent, during flattening by tightening the nut, excessive local deformation of the brace. While other methods may be used to flatten and elongate the braces, the methods shown produce the desired effect of wedging the braces in place inside the rail flanges and the braces function over the entire tolerance range of the extruded components. Variations in the component sizes can be compensated for by varying the amount of flattening which each of the hook braces undergoes.

Figure 7:
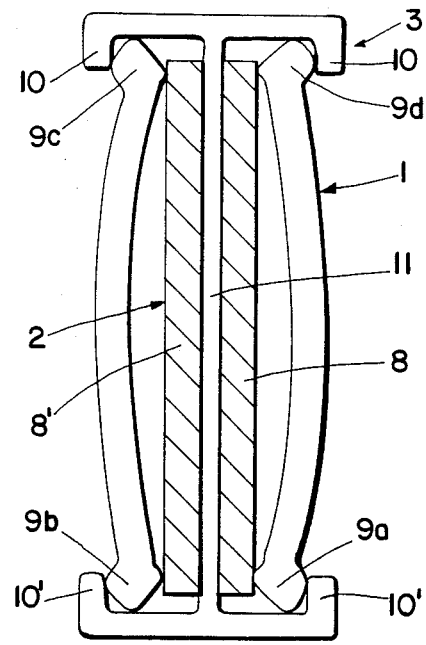
FIG. 7 is a sectional view similar to that of FIG. 6 but showing the brace assembled to a smaller side rail.

FIGS. 6 and 7 illustrate the difference in flattening which would occur when used at the top of the tolerance scale (FIG. 6) versus a siderail at the bottom of the tolerance scale (FIG. 7).

It will be noted that the brace of this invention strengthens and reinforces the hook to rail connection and is adapted to be either installed in the field with readily available tools or can be installed prior to the field installation.

While I have described my invention in connection with the above embodiments I am aware that numerous and extensive departures can be made therein and applications thereof, without however departing from the spirit of my invention or the scope thereof except insofar as the appended claims are so limited.

What I claim is:

1. Apparatus for securing an offset hook having a web attachment portion to an I-beam having upper and lower end flanges, said apparatus comprising brace means of ductile material and of substantially C-shape form, said brace means adapted to be interposed between the lower end flanges of said beam and the hook portion attached to the web of the beam, and means for applying force to a medial portion of said brace to flatten and extend the brace causing the brace to rotate and be wedged between the upper and lower end flanges of the beam and to fill a gap between the hook portion attached to the web of the beam and to reinforce the hook-to-beam connection.

2. Apparatus as claimed in claim 1 wherein the C-shaped brace is provided with nodes or bulbs at either end adapted to be lodged securely in the gaps provided between the end flanges of the beam and the web attachment portions of the hook.

3. Apparatus as claimed in claim 1 wherein the means for application of force to the brace is applied medially of the brace to cause extension thereof to assist in wedging of the brace to fill the gap.

4. Apparatus as claimed in claim 1 wherein the brace is provided with a central aperture adapted to be aligned with aligned openings in the hook attachment portion and the web of the beam, bolt means adapted to be disposed through the brace, hook and beam adapted to be tightened to flatten and elongate the brace to wedge the same within the gap.

5. The method of strengthening an attachment of an offset hook to an I-beam which comprises placing an extruded concave brace of ductile material in a gap between the hook and a flange of the I-beam rotating the brace into the gap between the flange and the hook and flattening the brace to cause the same to be extended and be wedged into the said gap.

* * * * *